United States Patent [19]
Hodson et al.

[11] Patent Number: 5,264,462
[45] Date of Patent: Nov. 23, 1993

[54] POLYMERIC FOAMS

[75] Inventors: Roger J. Hodson; Richard L. Powell, both of Cheshire, England; David Randall, Everberg, Belgium

[73] Assignee: Imperial Chemical Industries PLC, London, England

[21] Appl. No.: 26,218

[22] Filed: Mar. 1, 1993

Related U.S. Application Data

[63] Continuation of Ser. No. 575,525, Aug. 31, 1990, abandoned.

[30] Foreign Application Priority Data

Aug. 31, 1989 [GB] United Kingdom ............... 8919675

[51] Int. Cl.$^5$ ............................................. C08J 9/14
[52] U.S. Cl. ..................................... 521/88; 521/114; 521/131; 521/146
[58] Field of Search ................. 521/88, 114, 131, 146

[56] References Cited

U.S. PATENT DOCUMENTS

| | | | |
|---|---|---|---|
| 3,912,665 | 10/1975 | Spitzer et al. | 521/78 |
| 3,912,666 | 10/1975 | Spitzer et al. | 521/78 |
| 3,912,667 | 10/1975 | Spitzer et al. | 521/98 |
| 3,922,228 | 11/1975 | Hutchinson | 252/305 |
| 4,041,148 | 8/1977 | Simons | 252/305 |
| 4,263,412 | 4/1981 | Pauls | 521/159 |
| 4,328,319 | 5/1982 | Osipow et al. | 521/78 |
| 4,422,877 | 12/1983 | Spitzer et al. | 521/78 |
| 4,999,127 | 3/1991 | Merchant | 521/131 |
| 5,137,932 | 8/1992 | Behme et al. | 521/131 |
| 5,169,873 | 12/1992 | Behme et al. | 521/131 |

FOREIGN PATENT DOCUMENTS

| | | |
|---|---|---|
| 1373014 | 3/1963 | France . |
| 659251 | 10/1951 | United Kingdom . |
| 1193122 | 5/1970 | United Kingdom . |

OTHER PUBLICATIONS

Schutz, "Approaches to substitute R11 in rigid polyurethane applications", UTECH Conference, Apr. 1990.

Primary Examiner—Morton Foelak
Attorney, Agent, or Firm—Cushman, Darby & Cushman

[57] ABSTRACT

A method for the preparation of a polymeric foam which comprises vaporising a fluorine-containing ether in the presence of a foamable polymer or the precursors of a foamable polymer.

20 Claims, No Drawings

POLYMERIC FOAMS

This is a continuation of application Ser. No. 07/575,525, filed on Aug. 31, 1990, which was abandoned.

This invention relates to polymeric foams and to methods for their preparation.

The manufacture of polymeric foams by processes involving the vaporisation of a low boiling point liquid in the presence of a polymeric material or precursors thereof is well established. As examples of such processes, there may be mentioned the production of expanded polystyrene beads containing entrapped blowing agent and the production of polyurethane foams by causing polyurethane precursors to interact in the presence of a blowing agent, vaporisation in this case being brought about by the exothermic reaction.

The foams made by these processes can, depending upon the amount of blowing agent used, vary in density from about 10 kg/m$^3$ to about 1100 kg/m$^3$. Similarly, depending upon the starting components, the foams can vary in texture from very soft types useful in upholstery applications to rigid foams useful as structural or insulating materials.

A number of volatile blowing agents have been proposed but the ones most commonly used for some thirty years have been fully halogenated chlorofluorocarbons such as trichlorofluoromethane and dichlorodifluoromethane.

In recent years, however, chlorofluorocarbons have been suspected of contributing to depletion of the earth's ozone layer and there is general agreement that their manufacture and use should be severely restricted.

Several low boiling fluorine-containing compounds have already been proposed as alternative blowing agents. These have included hydrochlorofluoroalkanes, hydrofluoroalkanes, perfluoroalkanes and perfluorocycloalkanes, that is to say compounds having low or zero ozone depletion potentials because of the presence of hydrogen atoms or the absence of chlorine atoms. Unfortunately, in some respects, the performance of these alternative agents is inferior to that of the chlorofluorocarbons. Thus, the amount required to achieve a given density can be higher and the foams obtained can have less satisfactory insulation and mechanical properties.

The selection of an alternative blowing agent is therefore not a simple matter and, in any case, a low ozone depletion potential is not the sole requirement. Other properties expected of a blowing agent include low toxicity, low flammability, high stability in the presence of other foam formulation ingredients and freedom from objectional odour.

In addition to the above mentioned requirements, it has been suggested that significant concentrations of halocarbons in the atmosphere could contribute to global warming (the so-called greenhouse effect). It is desirable, therefore, to use blowing agents which have a relatively short atmospheric lifetime because of their capability of reacting with other atmospheric constituents.

The present invention provides a method for the preparation of a polymeric foam which comprises vaporising a fluorine-containing ether in the presence of a foamable polymer or the precursors of a foamable polymer.

Especially suitable fluorine-containing ethers for use in the method of the invention have boiling points in the range from −50° to 80° C., especially −35 to 70° C., at 1 bar.

It is preferred to use fluorine-containing ethers containing no other halogen atoms to ensure zero ozone depletion potential.

Thus, fluorine-containing ethers which may be used in the method of the invention include dimethyl ethers containing one or more fluorine atoms and no other halogen atoms.

As examples of fluorine-containing dimethyl ethers free from other halogen atoms, there may be mentioned di(trifluoromethyl) ether, difluoromethyl trifluoromethyl ether, fluoromethyl trifluoromethyl ether, di(difluoromethyl) ether, trifluoromethyl methyl ether, difluoromethyl methyl ether, difluoromethyl fluoromethyl ether, di(fluoromethyl) ether and fluoromethyl methyl ether.

Other suitable fluorine-containing ethers contain three or more carbon atoms and may optionally have cyclic structures.

It is further preferred that the fluorine-containing ethers should contain at least one hydrogen to ensure a limited atmospheric lifetime. The presence of two or more hydrogen atoms is desirable to accelerate atmospheric breakdown still further but for low flammability more fluorine atoms than hydrogen atoms are preferred. The hydrogen atoms are preferably attached to one or both carbon atoms adjacent to the ether oxygen atom. In this connection, reference is made to studies reported by Wayne et al indicating an atmospheric lifetime of 0.9 year for $CFH_2OCH(CF_3)_2$ compared with 10.7 years for $CF_3CFH_2$ (FC-134a).

As examples of preferred ethers, there may be mentioned $CF_3OCF_2H$, $CF_3OCH_2F$, $CF_3OCH_3$, $CF_2HOCF_2H$, $CF_3CH_2OCF_2H$, $HCF_2CF_2OCF_2H$, $CF_3CF_2OCF_2H$, $CF_3CFHOCF_2H$, $HCF_2CFHOCF_2H$, $(CF_3)_2CHOCHF_2$, $CF_3CF_2CH_2OCH_2F$, $CF_3CF_2CH_2OCHF_2$, $HCF_2CF_2CH_2OCF_3$, $HCF_2CF_2CHFOCHF_2$, $CF_3CF_2CHFOCHF_2$, $CF_3CF_2CHFOCF_3$, $HCF_2CF_2OCHFCHF_2$, $CF_3CHFOCHFCF_3$, $HCF_2CF_2OCF_2CHF_2$, $CF_3CH_2OCF_2CF_3$, $CF_3CF_2OCF_2CF_2H$, $CF_3CHFCF_2CH_2OCF_3$, $HCF_2OCF_2CHFOCHF_2$ and heptafluoro-1,4-dioxan.

Still further useful ethers include $HCF_2CF_2OCH_3$, $CF_3CF_2CH_2OCH_3$, $CF_3CHFOCH_2CH_3$ and 2,2,3,3,-tetrafluoro-oxacyclobutane.

The fluorine-containing ethers may be used singly in the method of the invention or in the form of mixtures comprising two, three or more such compounds or in the form of mixtures with other volatile blowing agents for example dimethyl ether, hydrocarbons for example pentane and hexane, chlorinated hydrocarbons for example dichloromethane, 1,1,1-trichloroethane, trichloroethylene and tetrachloroethylene, hydrofluoroalkanes for example 1,2-difluoroethane and the tetrafluoroethanes, chlorofluorocarbons for example trichlorofluoromethane and dichlorodifluoromethane or hydrochlorofluorocarbons for example chlorodifluoromethane, 2,2,-dichloro-1,1,1-trifluoroethane, 1,1-dichloro-1-fluoroethane, 1-chloro-1,1-difluoroethane, 1-chloro-1-fluoroethane, 1-chloro-2-fluoroethane, 1-chloro-1,1,2-trifluoroethane, 1-chloro-1,2,2-trifluoroethane, 1,1,-dichloro-2,2-difluoroethane and 1,2,2-trichloro-1,1-difluoroethane. Any such mixtures may be azeotropes, zeotropes (mixtures of varying boiling point) or close boiling point mixtures.

From the viewpoint of ozone depletion, however, it is preferred to use blowing agent compositions from which chlorine compounds are entirely absent or are present as only minor components.

In accordance with the invention, the fluorine-containing ether (or mixture containing a fluorine-containing ether) is incorporated in a foamable polymer or in one or more precursors of a foamable polymer. In this connection, reactive components which react together during or after foaming to foam a foamable polymer are regarded as precursors of a foamable polymer.

Thus, a further aspect of the invention provides a foamable polymer or a precursor of a foamable polymer containing a fluorine-containing ether.

As examples of foamable polymers which may contain the blowing agents described herein, there may be mentioned polyolefins, for example polystyrene, poly vinyl chloride) and polyethylene.

Foams may be prepared from styrene polymers using conventional extrusion methods. Typically, a blowing agent composition comprising one or more fluorine-containing ether is injected into a heat-plastified styrene polymer stream within an extruder and admixed therewith prior to extrusion to form foam.

Examples of suitable styrene polymers include the solid homopolymers of styrene, α-methylstyrene, ring-alkylated styrenes and ring-halogenated styrenes and copolymers of these monomers with minor amounts of other readily co-polymerisable olefinic monomers such as methyl methacrylate, acrylonitrile, maleic anhydride, citraconic anhydride, itaconic anhydride, acrylic acid, N-vinylcarbazole, butadiene and divinylbenzene.

When used in the production of styrene polymer foams, the fluorine-containing ethers are typically used in amounts of from 5 to 20% by weight, based on the weight of polymer.

As examples of precursors of foamable polymers, there may be mentioned precursors of phenolic resin foams, silicon resin foams and especially isocyanate-based foams such as polyurethane, polyisocyanurate, polyurea, polycarbodiimide and polyimide foams.

The invention is of particular relevance to the production of isocyanate-based foams by processes involving the polymerisation, for example trimerisation, of an organic polyisocyanate and/or the reaction thereof with one or more compounds containing a plurality of isocyanate-reactive groups. The production of such foams has been fully described in the literature and the methods conventionally used may be readily adapted to the use of the blowing agents described herein.

In particular, the blowing agents may be used in the production of polyurethane and isocyanurate-modified polyurethane foams by processes comprising reacting an organic polyisocyanate with an organic polyol, optionally in the presence of cross-linking agents, chain extenders, foam-stabilising agents, surfactants, other blowing agents, catalysts for urethane formation, trimerisation catalysts, fire retardants, fillers, pigments, antioxidants, mould release agents and the like.

Thus, in a further aspect, the invention provides a polyurethane precursor containing a fluorine-containing ether.

The polyurethane precursor containing the blowing agent will be an organic polyisocyanate or an organic polyol. As examples of polyisocyanates there may be mentioned any of the polyisocyanates proposed in the literature for use in the production of foams. Of particular importance are aromatic diisocyanates such as tolylene and diphenylmethane diisocyanates in the well known pure, modified or crude forms. Special mention may be made of the so-called MDI variants (diphenylmethane diisocyanate modified by the introduction of urethane, allophanate, urea, biuret, carbodiimide, uretonimine or isocyanurate residues) and the mixtures of diphenylmethane diisocyanate(s) and oligomers threof known in the art as "crude" or "polymeric" MDI (polymethylene polyphenylene polyisocyanates).

Usually however, the blowing agent will be incorporated in the polyol. The nature of the organic polyol which may contain the blowing agent will depend on the type of foam being produced. In general, the polyols can have hydroxyl numbers of from 20 to 1830 but for the production of flexible foams typical polyols have hydroxyl numbers of from 20 to 100, especially from 25 to 75 and hydroxyl functionalities of 2 to 4, especially 2 or 3. For rigid foam production, the polyols typically have hydroxyl numbers of from 200 to 800, especially from 300 to 600 and hydroxyl functionalities of 2 to 8, especially 3 to 8.

Suitable organic polyols for polyurethane foam production are polymeric polyols such as hydroxyl-terminated polyethers, polyesters, polyesteramides, polythioethers, polycarbonates, polyacetals and polyolefins.

Suitable polyether polyols include products obtained by the polymerisation of a cyclic oxide, for example ethylene oxide, propylene oxide or tetrahydrofuran or by the addition of one or more such oxides to polyfunctional initiators, for example water, ethylene glycol, propylene glycol, diethylene glycol, glycerol, trimethylolpropane, sorbitol, sucrose, triethanolamine, ethylene diamine, tolylene diamine, diaminodiphenylmethane, polymethylene polyphenylene polyamines and mixtures thereof. Of particular importance are the polyoxypropylene polyols and poly (oxyethylene-oxypropylene) polyols obtained by the simultaneous or sequential addition of ethylene and propylene oxides to appropriate initiators.

Suitable polyester polyols include hydroxyl-terminated reaction products of polyhydric alcohols such as ethylene glycol, diethylene glycol, neopentyl glycol, hexamethylene glycol, glycerol, trimethylolpropane or pentaerythritol or mixtures thereof with polycarboxylic acids, especially dicarboxylic acids or their ester-forming derivatives, for example succinic, glutaric and adipic acids or their dimethyl esters, phthalic anhydride or dimethyl terephthalate. Polyesters obtained by the polymerisation of lactones, for example caprolactone, in conjunction with a polyol, may also be used. Polyesteramides may be obtained by the inclusion of aminoalcohols or polyamines in polyesterification mixtures.

Polythioether polyols which may be used include products obtained by condensing thiodiglycol either alone or with other glycols, dicarboxylic acids, formaldehyde, aminoalcohols or aminocarboxylic acids.

Polycarbonate polyols which may be used include products obtained by reacting diols such as 1,3-propanediol, 1,4-butanediol, 1,6-hexanediol, diethylene glycol or tetraethylene glycol with diaryl carbonates, for example diphenyl carbonate, or with phosgene.

Polyacetal polyols which may be used include those prepared by reacting glycols such as diethylene glycol, triethylene glycol and hexanediol with formaldehyde. Suitable polyacetals may also be prepared by polymerising cyclic acetals.

Suitable polyolefin polyols include hydroxyl-terminated butadiene homo- and copolymers, and poly(iso-butylene) polyols.

Thus, in a further embodiment of the invention there is provided a polyol composition comprising a polymeric polyol, especially a rigid foam polyol, containing a fluorine-containing ether and optionally one or more other conventional components (other than polyisocyanates) of foam formulations.

Other conventional components of foam formulations which may be present in the polyol compositions include non-polymeric polyols or polyamines useful as cross-linking or chain-extending agents, for example butanediol, diethyltoluene diamine or triethanolamine, foam-stabilising agents or surfactants, for example siloxane-oxyalkylene copolymers, urethane catalysts, for example tin compounds such as stannous octoate or dibutyltin dilaurate or tertiary amines such as dimethylcyclohexylamine or triethylene diamine, trimerisation catalysts, for example potassium acetate or lead octoate, fire-retardants, for example tris chloropropyl phosphate and other blowing agents, for example water.

In a still further embodiment of the invention there is provided a foamable composition comprising:
 a) an organic polyisocyanate,
 b) a polyol component comprising a polymeric polyol.
 c) a fluorine-containing ether and
 d) optionally one or more other conventional components of foam formulations The invention also provides a method for the preparation of polyurethane foams which comprises reacting an organic polyisocyanate with a polymeric polyol in the presence of a fluorine-containing ether.

In preparing the foams, which may be flexible, semi-rigid or rigid depending upon the components used, conventional techniques and mixing methods may be used and the foams may be produced in the form of mouldings slabstock, cavity fillings, sprayed foam, frothed foam or in the form of laminates with other materials such as hardboard, plaster board, plastics, paper or metals.

It will be appreciated by those skilled in the art that the above mentioned polyols may be supplemented or replaced by other isocyanate-reactive entities containing, for example, mercapto, primary or secondary amino, imino or enamino groups.

The isocyanate-based foams of the invention, which may be prepared using well known one-shot, prepolymer or semi-prepolymer techniques may have low densities or may be in the form of microcellular elastomers having densities of 0.8 $g/cm^3$ or more. The amount of blowing agent will be appropriate to the foam density it is desired to achieve. Suitable amounts can be determined without difficulty by persons skilled in the art.

When using those fluorine-containing ethers or mixtures containing the ethers which have boiling points below about 10° C. at atmospheric pressure, known techniques may be used such as have been described by R Wiedermann at pages 52-55 of the Proceedings of the SPI 32nd Annual Technical/Marketing Conference.

For the production of conventional polyurethane foams, isocyanate indices of from about 70 to about 140 are typical but higher indices, for example from 150 to 500, and trimerisation catalysts are required for the production of polyisocyanurate foams.

The invention is illustrated but not limited by the following Examples in which all parts are by weight.

EXAMPLE 1

A polystyrene foam was prepared by feeding polystyrene and 11% difluoromethyl trifluoromethyl ether into a tandem extruder assembly (64/89mm). An extruder temperature profile in the range 100°-230° C. was employed with a die temperature of 130°-145° C.

Foam output was approximately 80-90kg/h, the roduct having a thickness of 25-50mm and a density of 30 $kg/m^3$.

EXAMPLE 2

Rigid polyurethane foams were prepared from the following formulations:

|  | A | B |
| --- | --- | --- |
| Polyol 1 | 70 | 70 |
| Polyol 2 | 30 | 30 |
| N,N-dimethylbenzylamine | 3 | 3 |
| N,N-dimethylcyclohexylamine | 1.7 | 7 |
| Bis(2-dimethylaminoethyl) ether | 0.1 | 0.1 |
| Silicone B 8423 | 2 | 2 |
| Water | 4 | — |
| 1,1,2,2-tetrafluoroethyl methyl ether | 29 | 58 |
| Polymeric MDI | 165 | 98 |

In these formulations, Polyol 1 was a product having a hydroxyl number of 480 obtained by the oxypropylation of a mixture of diethylene glycol and a polyamine mixture containing diaminodiphenylmethane and polyamine oligomers thereof.

Polyol 2 was an ethylene oxide tipped polypropylene glycol (10% ethylene oxide) having a hydroxyl number of 56.

The following Table gives foaming characteristics and foam properties.

|  | A | B |
| --- | --- | --- |
| Start of rise (Secs) | 8 | 9 |
| String time (Secs) | 36 | 37 |
| Tack-free time (Secs) | 68 | 54 |
| End of rise (Secs) | 80 | 75 |
| Free rise density (kg/m$^3$) | 22.4 | 52.7 |
| Closed cell content (%) | 95.9 | — |
| Adhesion (J/m$^2$) |  |  |
| early | 11 | 367 |
| late | 69 | >300 |
| Initial λ-value (mW/mK) | 20.7 | — |

EXAMPLES 3-14

Further foams are prepared in accordance with Formulation A of Example 2, the 29 parts of fluorinated ether being replaced by the (equimolar) amounts of other fluorinated ethers indicated in the following Table which also gives densities and λ-values for the derived foams.

| Example | Ether | Weight ether | Density (kg/m$^3$) | λ−value (mW/mK at 10° C.) |
| --- | --- | --- | --- | --- |
| 3 | CF$_3$OCF$_2$H | 29.9 | 20.7 | 20.6 |
| 4 | CF$_3$OCH$_3$ | 22.0 | 23.6 | 21.0 |
| 5 | CF$_3$OCH$_2$F | 25.9 | 23.4 | 20.9 |
| 6 | HCF$_2$OCF$_2$H | 25.9 | 22.0 | 20.5 |
| 7 | (CF$_3$)$_2$CHOCH$_2$F | 43.9 | 24.0 | 20.2 |
| 8 | CF$_3$CF$_2$OCH$_2$F | 40.9 | 19.7 | 20.3 |
| 9 | CHF$_2$CF$_2$OCHF$_2$ | 36.9 | 21.9 | 19.8 |
| 10 | CF$_3$CH$_2$OCHF$_2$ | 33.0 | 23.6 | 20.5 |

-continued

| Example | Ether | Weight ether | Density (kg/m$^3$) | $\lambda$-value (mW/mK at 10° C.) |
|---------|-------|--------------|--------------------|-----------------------------------|
| 11 | CF$_3$CHFOCHF$_2$ | 36.9 | 22.4 | 20.3 |
| 12 | CF$_2$HCHFOCHF$_2$ | 32.9 | 23.1 | 20.3 |
| 13 | CF$_3$CF$_2$OCF$_2$CHF$_2$ | 51.8 | 19.3 | 20.0 |
| 14 | CF$_2$CF$_2$CH$_2$O | 28.6 | 25.1 | 19.4 |

We claim:

1. A method for the preparation of a polymeric foam which comprises vaporising a fluorine-containing ether which contains no other halogen atoms in the presence of a foamable polymer or the precursors of a foamable polymer.

2. A method according to claim 1 wherein the fluorine-containing ether has a boiling point in the range from −50° to 80° C. at 1 bar.

3. A method according to claim 2 wherein the ether has a boiling point of from −35° to 70° C. at 1 bar.

4. A method according to claim 1 wherein the fluorine-containing ether comprises a dimethyl ether containing one or more fluorine atoms.

5. A method according to claim 1 wherein the fluorine-containing ether contains three or more carbon atoms.

6. A method according to claim 5 wherein the fluorine-containing ether contains at least one hydrogen atom per molecule.

7. A method according to claim 6 wherein the ether contains two or more hydrogen atoms per molecule.

8. A method according to claim 7 wherein the ether contains more fluorine than hydrogen atoms.

9. A method according to claim 6 wherein the ether has at least one hydrogen atom attached to one or both carbon atoms adjacent to the oxygen atom.

10. A method according to claim 4 wherein the fluorine-containing ether comprises CF$_{33}$OCF$_{32}$H, CF$_3$OCH$_2$F, CF$_{33}$OCH$_3$ or CF$_{32}$HOCF$_{32}$H.

11. A method according to claim 5 wherein the fluorine-containing ether comprises (CF$_3$)$_2$CHOCH$_2$F, HCF$_2$CF$_2$OCH$_3$, CF$_3$CF$_2$OCHF$_2$, CHF$_2$CF$_2$OCHF$_2$, CF$_{32}$CH$_2$OCHF$_2$, CF$_3$CHFOCHF$_2$, CF$_2$HCHFOCHF$_2$, CF$_3$CF$_2$OCF$_2$CHF$_2$ or 2,2,3,3-tetrafluoro-oxacyclobutane.

12. A method according to claim 11 which comprises the step of incorporating a fluorine-containing ether in a foamable polymer or in one or more precursors of a foamable polymers.

13. A method according to claim 12 which comprises extruding a styrene polymer containing a fluorine-containing ether.

14. A method according to claim 13 wherein the styrene polymer contains from 5 to 20% by weight of fluorine-containing ether.

15. A method according to claim 1 which comprises reacting an organic polyisocyanate with a polymeric polyol in the presence of a fluorine-containing ether to form a polyurethane foam.

16. A method according to claim 15 wherein the organic polyisocyanate comprises a diphenylmethane diisocyanate.

17. A method according to claim 15 or claim 16 wherein the polymeric polyol has a hydroxyl number of from 200 to 800.

18. A method according to claim 17 wherein the polymeric polyol has a hydroxyl number of from 300 to 600.

19. A method according to claim 15 wherein the polymeric polyol has a hydroxyl functionality of from 2 to 8.

20. A method according to claim 19 wherein the polymeric polyol has a hydroxyl functionality of from 3 to 8.

* * * * *